CODED-SOUND, TELEVISION RECEIVER

Filed Oct. 5, 1948 4 Sheets-Sheet 1

GEORGE O. STRIKER
*INVENTOR.*

BY Bruce L. Burchard
HIS AGENT

May 1, 1951 G. O. STRIKER 2,551,068

CODED-SOUND, TELEVISION RECEIVER

Filed Oct. 5, 1948 4 Sheets-Sheet 2

GEORGE O. STRIKER
INVENTOR.

BY Bruce L. Burchard
HIS AGENT

May 1, 1951 G. O. STRIKER 2,551,068

CODED-SOUND, TELEVISION RECEIVER

Filed Oct. 5, 1948 4 Sheets-Sheet 3

GEORGE O. STRIKER
INVENTOR.

BY [signature]
HIS AGENT

May 1, 1951 — G. O. STRIKER — 2,551,068

CODED-SOUND, TELEVISION RECEIVER

Filed Oct. 5, 1948 — 4 Sheets-Sheet 4

GEORGE O. STRIKER
*INVENTOR.*

BY [signature]
HIS AGENT

Patented May 1, 1951 2,551,068

UNITED STATES PATENT OFFICE 2,551,068

CODED-SOUND, TELEVISION RECEIVER

George O. Striker, Chicago, Ill., assignor to Zenith Radio Corporation, a corporation of Illinois Application October 5, 1948, Serial No. 52,909

4 Claims. (Cl. 178—5.1)

This invention relates to television systems of the subscriber type, and more particularly to subscriber receivers for use in such systems for decoding and reproducing coded television signals transmitted from a coded signal transmitter, which receivers reproduce the coded television signals upon the receipt of suitable key signals from the transmitter.

It is an object of this invention to provide such a subscriber receiver for decoding and reproducing the audio signals associated with a received television signal, which audio signals have been coded at the transmitter, and which receiver decodes these audio signals upon the receipt of a suitable key signal transmitted thereto over a private channel between the transmitter and receiver.

Another object of this invention is to provide such a receiver for receiving and reproducing television signals having coded video signals and coded audio signals included therein, which receiver decodes the received video signals in response to a suitable key signal transmitted thereto over a private channel between the transmitter and receiver, and which receiver further decodes the received audio signals in response to the same key signal.

Figure 1:
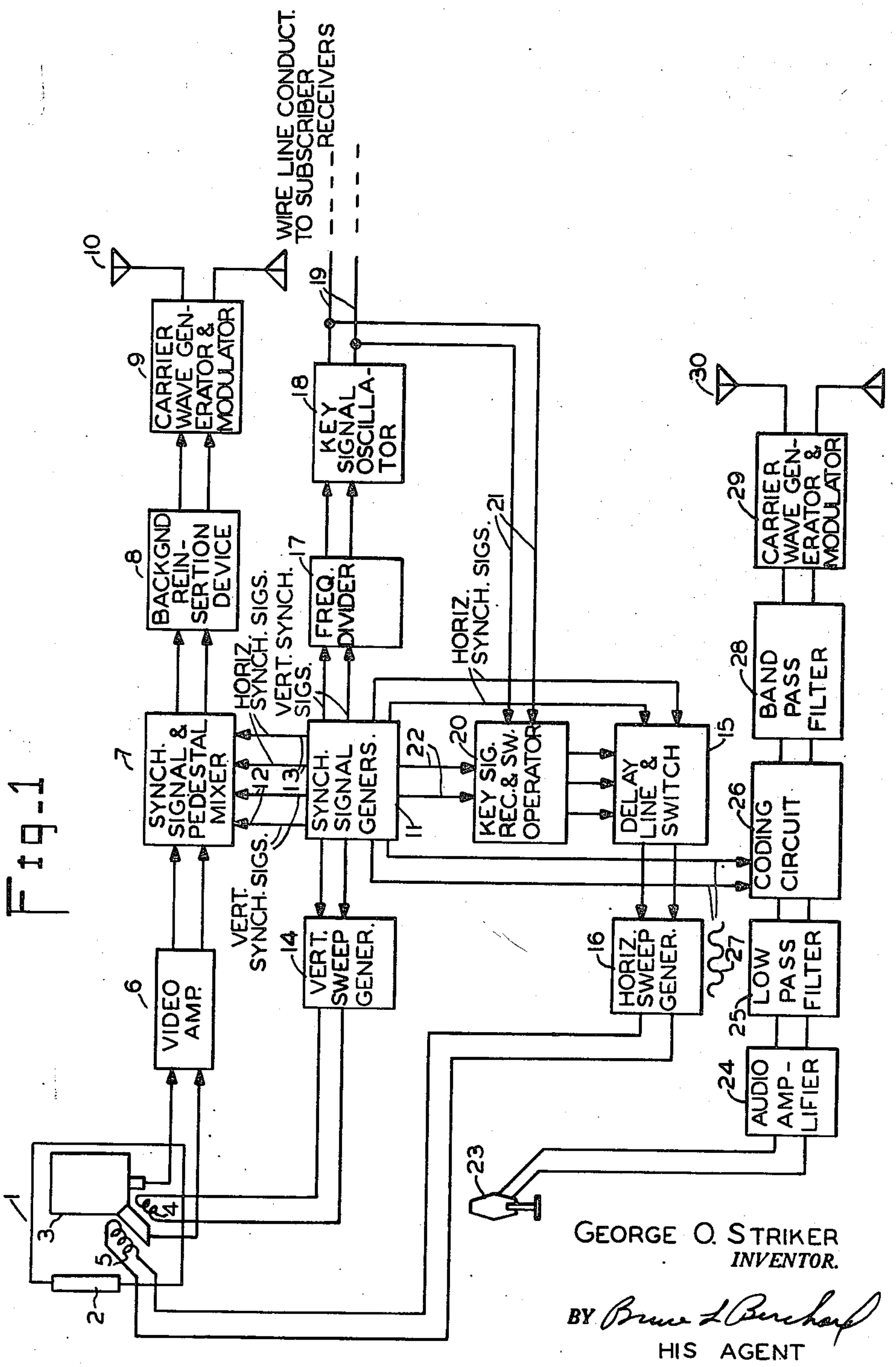
Figure 2:
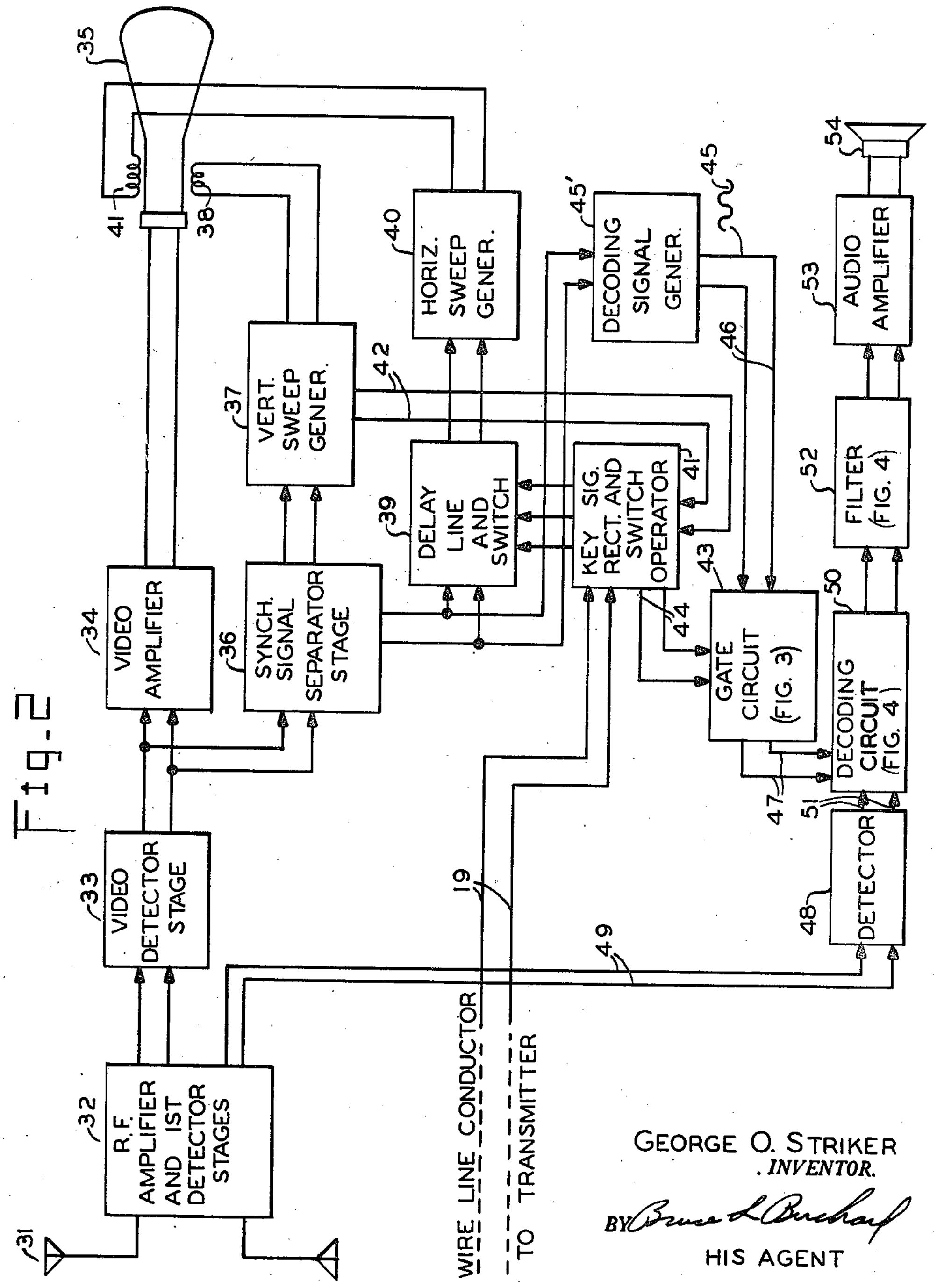
Figure 3:
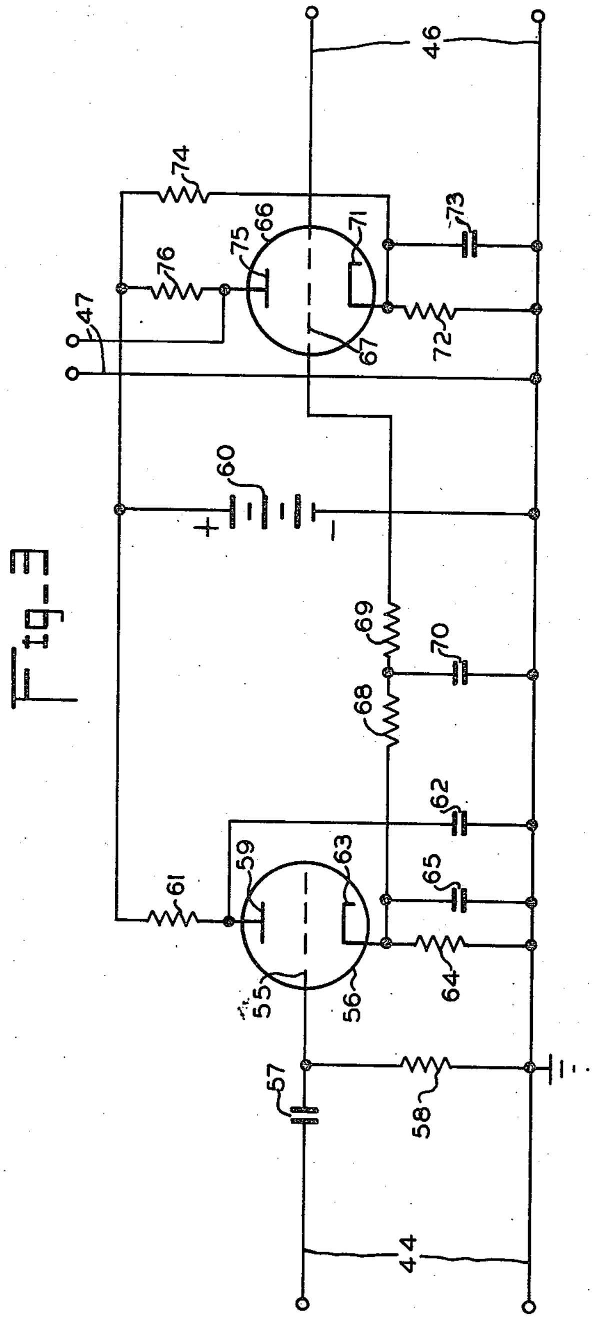
Figure 4:
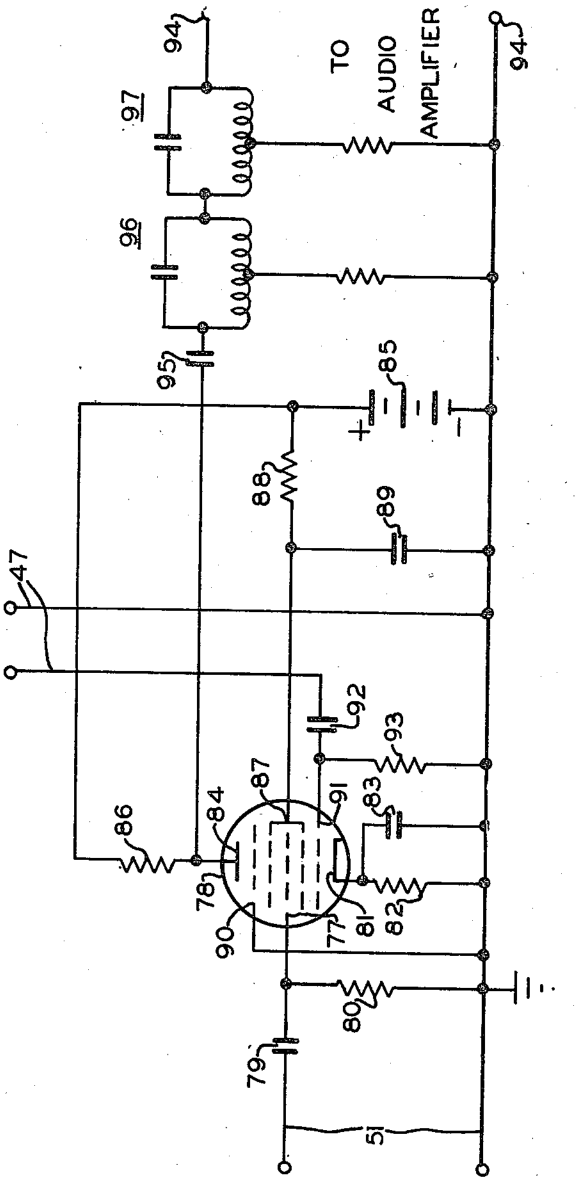

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a television system for transmitting coded audio and coded video signals, Figure 2 shows a receiver system for decoding and reproducing the coded signals received from the transmitter of Figure 1, and, Figures 3 and 4 show in detail various components of the receiver of Figure 2.

Application Serial Number 742,374, Ellett et al., entitled "Radio-Wire Signalling System," filed April 18, 1947, which has now matured to Patent No. 2,510,046, dated May 30, 1950; and application Serial Number 773,848, now Patent No. 2,547,598, granted April 3, 1951, Roschke, entitled Image Transmission System, filed September 13, 1947, both assigned to the present assignee, disclose and claim various television systems in which the video signal portion of a television signal is transmitted in coded fashion to subscriber receivers for reproduction in these receivers upon the receipt of decoding key signals. It is contemplated in the present invention to provide in such subscriber receivers a circuit for decoding the audio portion of the received television signal, which audio portion is coded in a manner similar to that disclosed in copending application Serial Number 52,079, Brown, entitled "Subscriber Signalling System," filed September 30, 1948, assigned to the present assignee, and which circuit utilizes the same key signal to decode the audio signal portion as is used by the receivers to decode the video signal portion of the received television signal.

Figure 1 shows a system including an arrangement for coding the video signal portion of a television signal. The illustrated arrangement is similar to that disclosed in aforementioned application Serial Number 773,848, although any similar coding system such as those disclosed in the previously mentioned application Serial Number 742,374 may be used. The system of Figure 1 also includes an arrangement for coding the audio portion of the television signal, such as disclosed in application Serial Number 52,079. The television signal transmitted by the transmitter of Figure 1, and consisting of coded video and coded audio signals, may be reproduced solely in subscriber receivers, to be described, upon the receipt of a key signal transmitted to such receivers over the telephone lines, power lines, or the like. The various components of the system of Figure 1 have either been fully described in the previously mentioned applications or are quite conventional, and a detailed description thereof is believed to be unnecessary.

In Figure 1 a television camera 1 contains a usual lens system 2 for focusing an image upon an iconoscope or image orthicon 3, which iconoscope is provided with the usual vertical scanning coil 4 and horizontal scanning coil 5. Video signals developed by the iconoscope 3 are amplified through a video amplifier 6, and subsequently transmitted to a synchronizing signal and pedestal mixer 7, in which appropriate pedestals and synchronizing signals are added to the video signals. The signals from mixer 7 are then applied through a background reinsertion device 8 to a carrier wave generator and modulator 9 in which the video signals, appropriately adjusted as to background level are modulated on a carrier wave which is radiated from antenna 10.

Normal vertical and horizontal synchronizing signals are generated by synchronizing signal generators 11, and these signals are impressed on mixer 7 by way of leads 12 and 13 respectively. Vertical synchronizing signals from generators 11 are applied to vertical sweep generator 14, the sweep signal output of which is impressed across vertical sweep coil 4 of iconoscope 3. Horizontal synchronizing signals from generators 11 are applied through delay line and switch 15 to horizontal sweep generator 16, the sweep output of generator 16 being impressed across the horizontal sweep coil 5 of iconoscope 3.

Vertical synchronizing signals from generators 11 are frequency divided in frequency divider 17, these frequency divided signals being utilized to trigger key signal oscillator 18. A burst of key signal is derived from oscillator 18 in response to each frequency divided signal applied thereto, and the key signal is transmitted to subscriber receivers over conductors 19, which conductor may be the telephone line, or the like. The key signal is also applied to rectifier and switch operator 20 by way of leads 21, each burst of key signal being rectified in this operator, and conditioning the operator to actuate a switch in delay line and switch 15 in response to vertical synchronizing signals applied to switch 20 by way of leads 22. Therefore, as fully described in application Serial Number 773,848, the key signal causes the delay line and switch 15 to delay the horizontal synchronizing signals passing therethrough at various intervals, and hence delays the horizontal scanning of the iconoscope 3 at such intervals. In this manner, the output signals are transmitted in a coded fashion, this coding comprising delaying the video signals at certain intervals with respect to the transmitted synchronizing signals.

The audio signals associated with the video signals are produced by microphone 23, and these audio signals are amplified in audio amplifier 24. The amplified audio signals are passed through a low pass filter 25 to a coding circuit 26. The purpose of circuit 26 is to code the audio signals by converting the frequencies thereof in a certain manner. To accomplish this a coding signal 27, preferably in the form of a sine wave synchronized with the horizontal synchronizing signals is obtained from signal generators 11, or this coding signal may be obtained from a separate generator synchronized to the frequency of the horizontal synchronizing signals, or some harmonic thereof. Coding circuit 26 may be any one of the well known modulator circuits, and when this circuit is of the type that the output thereof consists of upper and lower side bands containing the audio signals and a carrier having the frequency of the decoding signal 27, this output is passed through a band pass filter 28, which filter suppresses the carrier frequency and preferably the lower side band of the audio signals, the upper side band alone, which contains the original audio signals transposed in frequency, being modulated on a carrier wave in carrier wave generator and modulator 29, and this modulated carrier wave being radiated by antenna 30. In such case, the low pass filter 25 would be so designed that only frequencies below the frequency of coding signal 27 are passed thereby, to avoid interference with the upper side band signals modulated on the carrier wave in stage 29. When so desired the coding signal 27 may be frequency multiplied to a frequency which places the side bands of the modulated output of circuit 26 outside of the audio frequency range, and filter 28 designed to suppress the carrier frequency, and to pass solely the upper or lower frequency converted audio signal side bands or both side bands, which side bands may be modulated on the carrier wave in stage 29. Furthermore, when desired, coding circuit 26 may be of the balanced type modulator which suppresses the carrier and yields only the desired side bands, and in this instance the band pass filter 28 may be designed to suppress one of these side bands, or may be dispensed with. Hence, the audio signals are transmitted in converted or coded form, it being necessary to reproduce the coding signal 27 at a receiver to decode these signals.

In the receiver of Figure 2, television signals are received on antenna 31, and these signals are amplified and mixed with a local oscillator signal in conventional radio frequency amplifier and first detector stages 32. When the receiver is tuned to a conventional uncoded television signal, the receiver reproduces the video portion of this signal, as disclosed in application Serial No. 742,374, the video signal decoding circuits being inactive when the receiver is tuned to such a conventional signal and in the absence of key signals on conductors 19. Furthermore, as will be seen, the receiver reproduces the audio signals associated with such conventional television signal, the audio signal decoding circuits being similarly inactive when the receiver is tuned to receive such conventional television signals, and in the absence of key signals. Hence, the receiver operates to receive and reproduce, conventional uncoded television signals in a normal manner. However, when the receiver is tuned to receive a coded television signal such as transmitted by the transmitter of Figure 1, and appropriate key signals are received over conductors 19, the decoding circuits are actuated and the receiver reproduces these coded signals.

Assuming that the receiver is tuned to receive a coded television signal, such as transmitted by the transmitter of Figure 1, the video portion of such a signal is detected in video detector stage 33, and the detected video signal is amplified in video amplifier stages 34 and applied to a usual cathode ray receiver image tube 35. Synchronizing signals are separated from the received signal in separator stage 36, and vertical and horizontal synchronizing signals are obtained from this stage. The vertical synchronizing signals from stage 36 are applied to vertical sweep generator 37, and the sweep output of this generator is applied to vertical scanning coil 38 of image tube 35. Horizontal synchronizing signals from separator stage 36 are applied through delay line and switch 39 to horizontal sweep generator 40, and the sweep output of this generator is impressed on horizontal scanning coil 41 of tube 35. The delay line and switch 39 is operated to delay the horizontal synchronizing signals passing therethrough at intervals when the video signals in the received coded television signal are similarly delayed, and operates to compensate for this delay, and tube 35 reproduces the received video signals. The delay line and switch 39 is operated by key signal rectifier and switch operator 41, which operator is actuated by the action of the key signal received on conductors 19, and vertical blanking pulses from vertical sweep generator 37 received over leads 42. The above video signal decoding circuit is fully described in aforementioned application 773,848.

The key signal received over conductor 19 and rectified in stage 41 is also impressed on a gate circuit 43 over leads 44, which gate circuit opens in the presence of key signals and passes a decoding signal 45 from leads 46 to leads 47. Decoding signal 45 is of the same phase and frequency as the coding signal 27 of Figure 1, and this decoding signal is obtained from decoding signal generator 45', which generator is synchronized by the horizontal synchronizing signals from separator stage 36 in the usual manner. Although coding signal 27 of Figure 1 and decoding signal 45 preferably have the form of sine waves, it is obvious that any desired wave form may be used.

The coded sound signals contained in the received television signal are detected in usual detector stage 48, these signals being applied to detector 48 over leads 49. The detected signals are impressed on decoding circuit 50 by way of leads 51, in which circuit they are decoded by the frequency reconverting action of signal 45, this signal being impressed on circuit 50 by way of leads 46, gate circuit 43, and leads 47. The decoded detected audio signals are passed through a filter 52, which filter removes the decoding frequency and harmonics thereof from the detected decoded audio signals. The audio signals passed by filter 52 are amplified in audio amplifier 53 and reproduced in signal translating device 54. Gate circuit 43 is conductive only when key signals appear on conductor 19. When uncoded signals are received by the system, which signals are not accompanied by key signals, gate circuit 43 closes and the decoding signal 45 is not impressed on demodulator 50, and the audio section of the receiver acts as a conventional receiver to reproduce the uncoded signals.

It is noted that when the coded audio signal side bands from modulator 26 of Figure 1 are frequency modulated on the carrier wave in stage 29 of Figure 1, as is usually the case, the frequencies of the coded audio signals contained in these side bands extend far into the supersonic range. It is therefore desirable to disable the well known frequency de-emphasis network usually contained in detector 48 of Figure 2, when this detector is of the conventional discriminator type. This disabling of the de-emphasis network is desirable in order to pass on to the decoding circuit 50 of Figure 2, the side bands containing the frequency converted audio signals, as these side bands would be otherwise suppressed.

One form of gate circuit, suitable for use as stage 43 in Figure 2, is shown in detail in Figure 3. In the circuit of Figure 3, positive going rectified pulses derived from the key signal in stage 41 of Figure 2 are received over leads 44. One of these leads is grounded and the other coupled to control electrode 55 of electron discharge device 56 through a capacitor 57, the control electrode 55 being connected to ground through grid leak resistor 58. The anode 59 of device 56 is connected to the positive terminal of a source of unidirectional potential 60 through a load resistor 61, the negative terminal of this source being grounded. Anode 59 of device 56 is bypassed to ground through capacitor 62. The cathode 63 of device 56 is grounded through cathode resistor 64, this resistor being shunted by a capacitor 65. When the positive going pulses appear on leads 44, these pulses are impressed on control electrode 55 and increase the space current flowing in device 56, and hence raise the potential of cathode 63. The time constant of the capacitor 65 and resistor 64 in the circuit of cathode 63 is made such that the cathode remains at this increased potential as long as the positive going pulses appear on leads 44, and hence as long as key signals appear on leads 19 of Figure 2.

The discharge device 56 is coupled to an electron discharge device 66 by means of a connection from cathode 63 of device 56 to control electrode 67 of device 66 through series connected resistors 68 and 69, the junction of these resistors being coupled to ground through a capacitor 70. The cathode 71 of device 66 is connected to ground through cathode resistor 72 shunted by capacitor 73, and this cathode is further connected to the positive terminal of source 60 through resistor 74, and is hence positively biased by the potential divider action of resistor 72 and 74. The anode 75 of device 66 is connected to the positive terminal of source 60 through load resistor 76.

The decoding signal 45 of Figure 2 appears across leads 46, one of these leads being grounded and the other connected to control electrode 67 of device 66. When positive going pulses appear across leads 44, the resulting rise in potential of cathode 63 of device 66 causes the potential of control electrode 67 of device 66 to rise and overcome the positive bias on cathode 71. Hence, when the positive going pulses appear on leads 44, the signal on leads 46 is amplified by device 66, and the amplified signal appears across leads 47. One of the leads 47 is grounded and the other connected to anode 75 of device 66, and these leads are connected at their other extremity to the decoding circuit 50 of Figure 2. Therefore, the signal on leads 46 is passed to the leads 47 by the present circuit, only when the rectified key signal appears across leads 44. Capacitors 62 and 65 and their associated resistors are effective to prevent the pulses across leads 44 from entering the circuit of device 66 and interfering with the signal passed from leads 46 to leads 47.

One embodiment of the decoding circuit 50 and filter 52 of Figure 2 is shown in detail in Figure 4. In the circuit of Figure 4, detected signals from audio detector 48 of Figure 2 appear across leads 51. One of the leads 51 is grounded, and the other coupled to control electrode 77 of electron discharge device 78 through coupling capacitor 79, this control electrode being connected to ground through a grid leak resistor 80. The cathode 81 of device 78 is connected to ground through cathode resistor 82 shunted by capacitor 83. The anode 84 of this device is connected to the positive terminal of a source of unidirectional potential 85 through a load resistor 86, the negative terminal of this source being grounded. The screen electrode 87 of device 78 is connected to the positive terminal of source 85 through a resistor 88, this electrode being bypassed to ground through capacitor 89. The suppressor electrode 90 of device 78 is connected directly to ground.

The decoding signal 45 from the horizontal sweep generator 40 of Figure 2 appears across leads 47 when gate circuit 43 of Figures 2 and 3 is conductive, one of leads 47 being grounded and the other coupled to control electrode 91 of device 78 through a capacitor 92, control electrode 91 being connected to ground through grid leak resistor 93. The anode 84 of device 78 is further connected to output terminals 94 through a capacitor 95 and filter networks 96 and 97. The decoding signal on conductors 47 is identical as to frequency and relative phase to the coding signal 27 of Figure 1. This decoding signal acts to reconvert the frequencies of the coded audio signals from detector 48 of Figure 2, and these audio signals appear across terminals 94 in decoded form. The decorded audio signals are amplified in audio amplifier 53 and reproduced in signal translating device 54 of Figure 2. Filters 96 and 97 are arranged in the conventional manner to suppress the first and second harmonics of the signal on leads 47, which components are normally amplified by the circuit of device 78, and in the absence of filters 96 and 97, interfere with the audio signals at terminals 94.

This invention therefore provides a subscriber television receiver, which receiver decodes and reproduces the coded video signal portion of a received coded television signal upon the receipt of a suitable key signal and which receiver includes, a circuit for decoding the coded audio signal portion of the received television signal, this circuit being actuated by the same key signal as is used to decode the video signal portion of the received television signal.

It is apparent that the present receiver circuit may be used in receiver systems for receiving television signals in which solely the audio signal portion is coded, it being merely necessary that key signals be received and conditioned to actuate the gate circuit 43 of Figure 2, thus applying the decoding signal to the decoding circuit 50.

While particular embodiments of the invention have been shown and described, modifications may be made. It is intended in the appended claims to cover any such modifications as fall within the true spirit and scope of the invention.

I claim:

1. A subscription television receiver for utilizing a television signal including an image signal and an associated coded audio signal, and for concurrently utilizing a key signal received over a line circuit, said receiver comprising: an image-reproducing device; means for supplying said image signal to said image-reproducing device; an audio-signal reproducing device; apparatus for supplying said audio signal to said audio reproducing device; a decoding circuit included in said last-mentioned apparatus and responsive to an applied signal for decoding said audio signal; a decoding-signal generator for applying a decoding signal to said decoding circuit to actuate said circuit; a gate circuit disposed between said decoding-signal generator and said decoding circuit for translating said decoding signal to said decoding circuit upon actuation by an applied signal; and means coupled to said line circuit for applying said key signal to said gate circuit to cause said gate circuit continuously to translate said decoding signal during the presence of said key signal.

2. A subscription television receiver for utilizing a television signal comprising, an image signal including synchronizing-signal components, and an associated audio signal coded in accordance with a coding signal synchronized with said synchronizing components, and for concurrently utilizing a key signal received over a line circuit, said receiver comprising: an image-reproducing device and an associated scanning system; circuit means for supplying said image signal to said image-reproducing device; means coupled to said circuit means for supplying said synchronizing components to said scanning system; an audio-signal reproducing device; apparatus for supplying said audio signal to said audio reproducing device; a decoding circuit included in said last-mentioned apparatus and responsive to an applied signal for decoding said coded audio signal; a decoding-signal generator for applying a decoding signal to said decoding circuit; means for supplying said synchronizing-signal components of said image signal to said decoding-signal generator to synchronize said generator; a gate circuit disposed between said decoding-signal generator and said decoding circuit for translating said decoding signal to said decoding circuit upon actuation by an applied signal; and means coupled to said line circuit for applying said key signal to said gate circuit to cause said gate circuit continuously to translate said decoding signal during the presence of said key signal.

3. A subscription television receiver for utilizing a television signal comprising, an image signal including synchronizing-signal components, and an associated audio signal frequency-converted in accordance with a coding signal synchronized with said synchronizing components, and for concurrently utilizing a key signal received over a line circuit, said receiver comprising: an image-reproducing device and an associated scanning system; circuit means for supplying said image signal to said image-reproducing device; means coupled to said circuit means for supplying said synchronizing components to said scanning system; an audio-signal reproducing device; apparatus for supplying said audio signal to said audio reproducing device; a decoding circuit included in said last-mentioned apparatus and responsive to an applied signal for frequency-reconverting said audio signal; a decoding-signal generator for applying a decoding signal to said decoding circuit to actuate said circuit; means for supplying said synchronizing-signal components of said image signal to said decoding-signal generator to synchronize said generator and cause said decoding signal to have a frequency and phase corresponding to said coding signal; a gate circuit disposed between said decoding signal generator and said decoding circuit for translating said decoding signal to said decoding circuit upon actuation by an applied signal; and means coupled to said line circuit for applying said key signal to said gate circuit to cause said gate circuit continuously to translate said decoding signal during the presence of said key signal.

4. A subscription television receiver for utilizing a coded television signal comprising, an image signal including synchronizing-signal components, and an associated audio signal coded in accordance with a coding signal synchronized with said synchronizing components, and for concurrently utilizing a key signal indicating the coding schedule of said television signal and received over a line circuit, said receiver comprising: an image-reproducing device; apparatus for supplying said television signal to said image-reproducing device; a first decoding circuit included in said apparatus and coupled to said line circuit for decoding said television signal in response to said key signal; an audio-signal reproducing device; apparatus for supplying said audio signal to said audio-signal reproducing device; a second decoding circuit included in said last-named apparatus and responsive to an applied signal for decoding said coded audio signal; a decoding-signal generator for applying a decoding signal to said second decoding circuit; means for supplying said synchronizing-signal components of said image signal to said decoding signal generator to synchronize said generator; a gate circuit disposed between said decoding signal generator and said second decoding circuit for translating said decoding signal to said second decoding circuit upon actuation of said gate circuit by an applied signal; and means coupled to said line circuit for applying said key signal to said gate circuit to cause said gate circuit continuously to translate said decoding signal during the presence of said key signal.

GEORGE O. STRIKER.

REFERENCES CITED

The following references are of record in the file of this patent:

UNITED STATES PATENTS

| Number | Name | Date |
|---|---|---|
| 1,754,876 | Clements | Apr. 15, 1930 |
| 2,405,252 | Goldsmith | Aug. 6, 1946 |
| 2,414,101 | Hogan | Jan. 14, 1947 |
| 2,419,568 | Labin | Apr. 29, 1947 |
| 2,462,061 | Beatty | Feb. 22, 1949 |
| 2,477,625 | Labin | Aug. 2, 1949 |
| 2,477,679 | Young | Aug. 2, 1949 |
| 2,502,213 | Fredendall | Mar. 28, 1950 |

FOREIGN PATENTS

| Number | Country | Date |
|---|---|---|
| 564,511 | Great Britain | Oct. 2, 1944 |